(12) United States Patent
Slettaøyen

(10) Patent No.: US 7,794,635 B2
(45) Date of Patent: Sep. 14, 2010

(54) PROCESS FOR PRODUCING A MATTRESS

(75) Inventor: Odd Slettaøyen, Åndalsnes (NO)

(73) Assignee: Wonderland AS, Andalsnes (NO)

( * ) Notice: Subject to any disclaimer, the term of this patent is extended or adjusted under 35 U.S.C. 154(b) by 467 days.

(21) Appl. No.: 10/564,320

(22) PCT Filed: Jul. 15, 2004

(86) PCT No.: PCT/NO2004/000217

§ 371 (c)(1),
(2), (4) Date: Jan. 10, 2006

(87) PCT Pub. No.: WO2005/005308

PCT Pub. Date: Jan. 20, 2005

(65) Prior Publication Data

US 2006/0237867 A1    Oct. 26, 2006

(30) Foreign Application Priority Data

Jul. 15, 2003   (NO) .................................. 20033208

(51) Int. Cl.
*B29C 65/70* (2006.01)
(52) U.S. Cl. ...................... 264/46.5; 264/251; 264/261; 264/319; 264/321
(58) Field of Classification Search .................. 264/41, 264/45.1, 46.4, 46.5
See application file for complete search history.

(56) References Cited

U.S. PATENT DOCUMENTS

| | | | |
|---|---|---|---|
| 3,099,021 A | | 7/1963 | Wetzler |
| 3,099,518 A | * | 7/1963 | Wetzler .................... 264/46.2 |
| 3,133,853 A | * | 5/1964 | Knox ........................ 428/160 |
| 4,876,053 A | * | 10/1989 | Norton et al. .............. 264/255 |
| 2003/0019043 A1 | * | 1/2003 | Bryant et al. .................. 5/719 |
| 2006/0237867 A1 | * | 10/2006 | Slettayen ................... 264/46.5 |

FOREIGN PATENT DOCUMENTS

| | | |
|---|---|---|
| AT | 316983 | 8/1974 |
| EP | 1048248 | 11/2000 |

OTHER PUBLICATIONS

Norwegian Search Report for Norwegian Patent No. 20033208 dated March 3, 2004. International Search Report for International Application No. PCT/NO2004/000217 dated Dec. 20, 2004.

* cited by examiner

*Primary Examiner*—Monica A Huson
(74) *Attorney, Agent, or Firm*—Kolisch Hartwell, PC

(57) ABSTRACT

The present invention relates to process for the manufacturing of mattresses characterized in that a liquid molding substance of the same material as the construction pieces (1, 3, 4, 6) is used in all the joints between the pieces. The process comprises steps wherein: the bottom piece (1) is laid out; the molding substance (2) is applied to the longitudinal edges (3) and cross edges (4) on one surface side of the bottom piece (1); the longitudinal pieces (3) and cross pieces (4) are lowered into a molding substance (2) and hardened; the molding substance (2) is applied on the same surface side of the bottom piece (1) between the longitudinal pieces (3) and cross pieces (4); a core (6) is lowered into the molding substance (2) and hardened; and the top piece (7) is provided with molding substance (2) and turned with the molding substance (2) facing the named upright longitudinal pieces (3) and cross pieces (4) and lowered onto the same and hardened.

10 Claims, 4 Drawing Sheets

PROCESS FOR PRODUCING A MATTRESS

The present invention relates to the process for manufacturing a mattress, and especially to the manufacturing of mattresses consisting of elements of foam material containing a core of springs for example.

BACKGROUND OF THE INVENTION

Production of mattresses of the above type using liquid polyurethane in order to fasten the spring core to at least one opposite substrate area of polyurethane foam, in order to more rapidly produce such mattresses, is known in prior art from Danish Patent no. 146092 B.

From current production methods, it is known that this method can be employed by equipping one of the surfaces of the base piece with longitudinal streaks of liquid polyurethane, along the longitudinal edges of the base piece, onto which two longitudinal pieces of polyurethane foam are lowered and hardened. Thereafter, the area between the longitudinal pieces and the base piece is provided with the same substance onto which a spring core is lowered, as described in Danish Patent no. 146092 B. Finally, a top piece corresponding to the bottom piece is moulded in the same way, on top of the core and longitudinal pieces.

The result obtained is an unfinished mattress, lacking cross pieces in the short ends of the unfinished mattress. The cross pieces are manually thread into the openings between the bottom, top and longitudinal pieces and then glued to these edges with an adhesive. This task must be done very accurately, as the seams are especially subjected to strain during transport and use of the mattress. The manual process is consequently time consuming and expensive compared to an automated production line.

The glueing according to the present technique also has the disadvantage of seams consisting of two different materials, which will have a tendency to delaminate. The seams around the cross pieces therefore have the tendency to tear on such mattresses, even if the rest of the mattress is usable. Thus, this is a disadvantage for the user who must then send the mattress away for repair, or replace the mattress altogether, although it should not be necessary to do so given the condition of the other mattress parts.

There therefore exists a need for a process which makes it possible to produce mattresses of the above type in an automated manner, and wherein the seams of the pieces are of a strong and durable quality, and a quality that is as consistent as possible throughout the whole mattress.

OBJECT OF THE INVENTION

The object of the present invention is to provide a process for the manufacturing of mattresses which solves the above problems.

DETAILED DESCRIPTION OF THE INVENTION

The present invention will be explained by reference to the attached Figures wherein.

The process according to the invention is characterised in that a joint material made of the same material as the pieces constituting the mattress is used, in all joints between the pieces which often are made of a foam material.

In this manner, the joint material melts/moulds the pieces together and the complete assemblage consists of one and the same material, thereby providing especially firm and solid joints.

It is, for example, common to use polyurethane foam sheets as outer parts for a mattress, and liquid polyurethane should therefore be used in order to mould/weld all the main parts together in the mattress construction.

Figure 1:
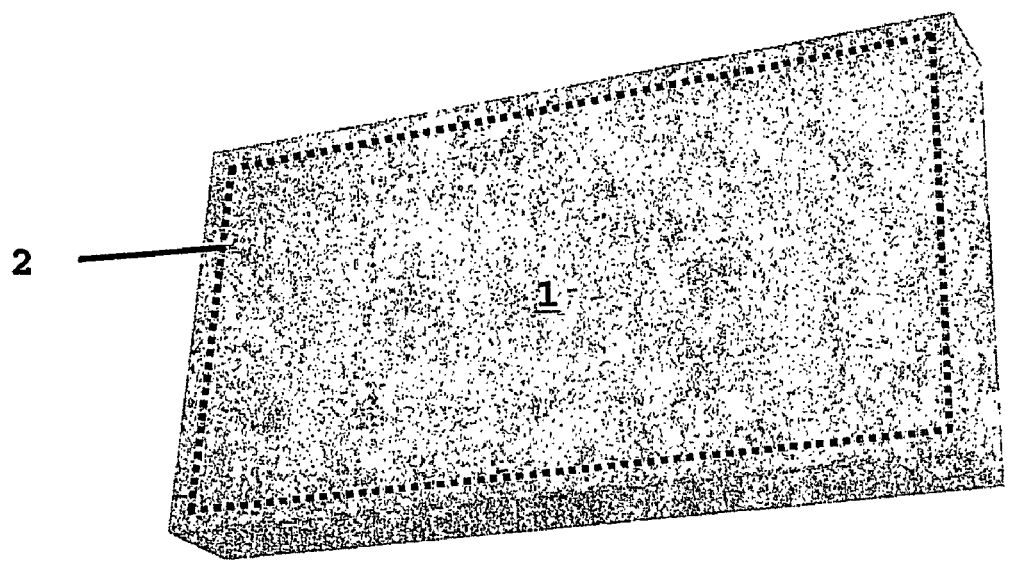
FIG. 1 depicts a perspective view of a base piece for a mattress.
Figure 2:
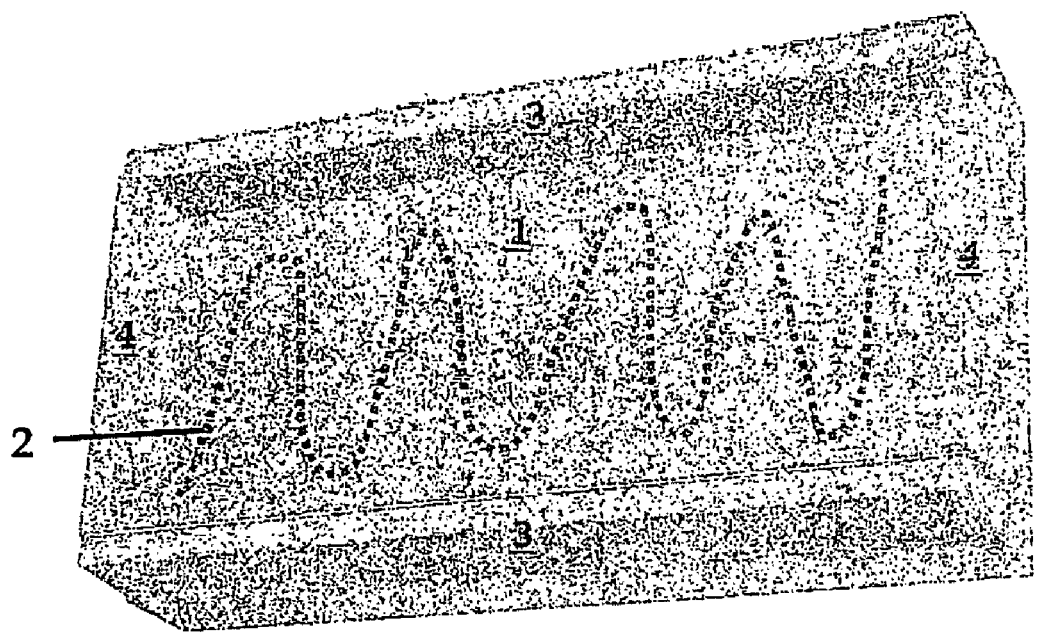
FIG. 2 depicts a perspective view of a base piece as well as side and cross pieces for a mattress.
Figure 3:
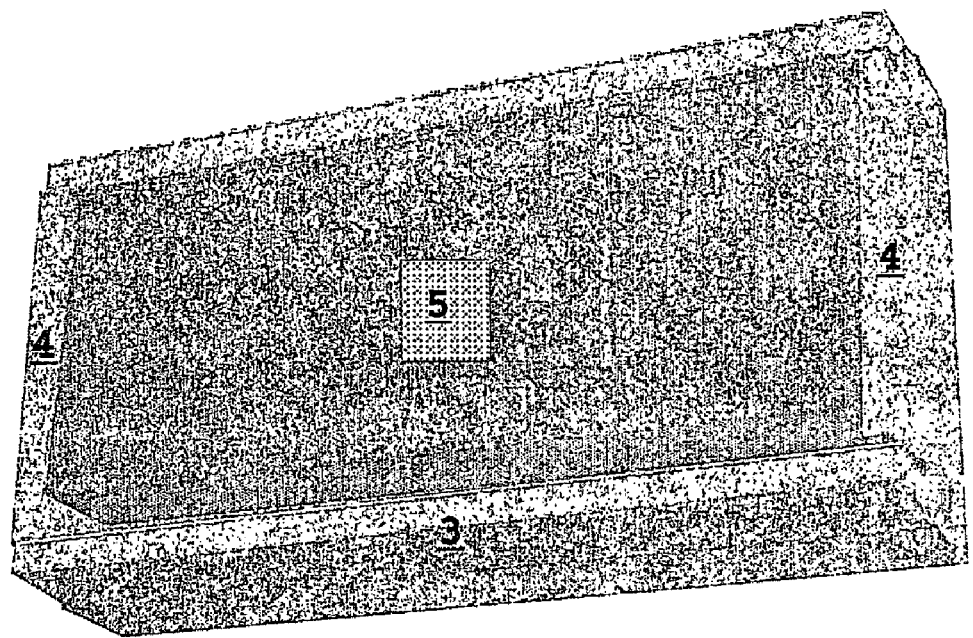
FIG. 3 depicts the pieces in FIG. 2 and a core.
Figure 4:
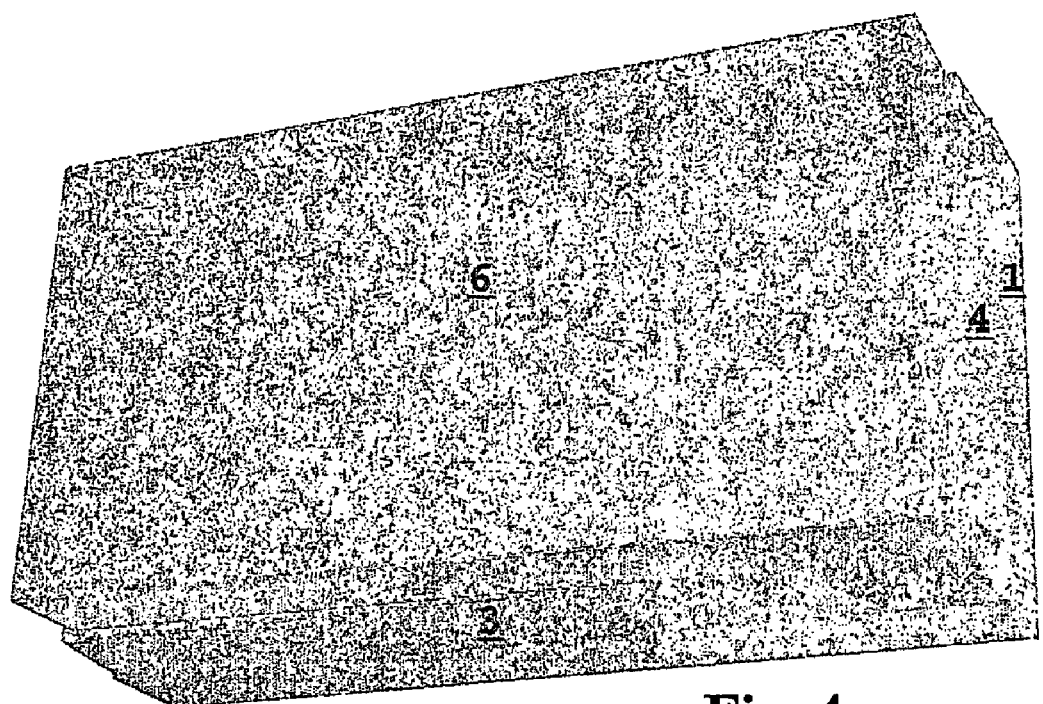
FIG. 4 depicts a perspective view of a completed mattress.

The process of the present invention consists in this embodiment of the following steps:

(I) The bottom piece 1 is laid out as shown in FIG. 1.
(II) The moulding substance 2 is applied to the longitudinal edges and cross edges on one surface side of the bottom piece 1, for example by a robot.
(III) The longitudinal pieces 3 and cross pieces 4 are then lowered into the moulding substance 2 in their respective positions as shown in FIG. 2, for example by a robot, and quickly becomes hardened.
(IV) The moulding substance 2 is applied on the same surface side of the bottom piece between the side and end pieces, for example by a robot.
(V) A core 5, such as a core of springs, is lowered into the moulding substance 2 as shown in FIG. 3, for example by a robot, and becomes quickly hardened.
(VI) A top piece 6 is provided with moulding substance, corresponding to the moulding substance 2 applied to the bottom piece, turned with the moulding substance facing the open side of the almost completed mattress above, and placed onto the same as shown in FIG. 4, for example by a robot.

In a modern production line, several of the above steps may of course be performed simultaneously or in another order.

For example, the application of moulding substance in steps II and IV are performed simultaneously in one embodiment, in order to increase the production speed. Thus, steps III and V, wherein the longitudinal pieces 3 and cross pieces 4, as well as the core 5 are lowered onto the base piece 1, may also be performed simultaneously in another embodiment, for the same reason.

It is therefore clear that the core 5 in alternative embodiments, may for example be lowered onto the base piece 1 simultaneously, during or after the lowering of the longitudinal pieces and cross pieces. The former pieces may likewise be lowered in an arbitrary order and possibly separately. This may for example be done if the base piece 1 is rotated through 90° turns in the surface plane, so that the longitudinal pieces and cross pieces are lowered one after the other successively or in pairs in time with the rotation of the base piece.

In the above described process, the corner joints between the side and cross pieces need not be provided with any moulding substance or glue. The bottom and top joints of the cross pieced achieved in the present process are thus much stronger than allowed by gluing as according to prior art processes, in that they tolerate both higher loads and such loads over longer periods of time than previously. In addition, a cover will provide further support when it is thread over the whole construction later in the production.

The pieces of the mattress are thereby held together with fewer and stronger joints than previously, making it possible to produce such mattresses faster and at more reasonable prices. The mattress without a cover thereby obtains a more attractive impression without disfiguring joints and glue spots.

However, if it should be desirable to close the mattress construction described above on the other hand, for example in order to avoid dust from entering into the construction during production and later use, the moulding substance may be injected manually or by the aid of an advanced robot into the corner joints between the cross and longitudinal pieces.

The process according to the present invention enables starting with a common production line for all mattresses which may later be divided into several lines for different qualities or semi-manufactured articles. More expensive components may then be inserted later in the process for example, and possibly custom adapted according to an ordering system.

The invention claimed is:

1. A process for the manufacturing of a mattress comprising a bottom piece, longitudinal pieces, cross pieces, and a top piece, said pieces being of the same material, and a core, characterised in that a liquid moulding substance (2) of the same material as the named pieces is used to join a plurality of discrete pieces comprising a bottom piece, longitudinal pieces, cross pieces, and a top piece by applying the liquid moulding substance in streaks in the contact area between the discrete pieces only.

2. A process according to claim 1, characterised in that the pieces comprise a foam material which may be brought into a liquid state and subsequently hardened.

3. A process according to claim 2, characterised in that the foam material is polyurethane.

4. A process according to any one of claims 1 to 3, characterised in that it comprises the following steps, wherein:
   (I) the bottom piece is laid out;
   (II) the moulding substance is applied to the longitudinal edges and cross edges on one surface side of the bottom piece;
   (III) the longitudinal pieces and cross pieces are lowered into the moulding substance and the moulding substance is hardened;
   (IV) the moulding substance is applied on the same surface side of the bottom piece between the longitudinal pieces and cross pieces;
   (V) a core is lowered into the moulding substance and the moulding substance is hardened; and
   (VI) a top piece is provided with moulding substance and turned with the moulding substance facing the named upright longitudinal pieces and cross pieces and lowered onto the same and the moulding substance is hardened.

5. A process according to claim 4, characterised in that in step II, the moulding substance is applied to the under edges of the longitudinal pieces and cross pieces simultaneously or in any order successively.

6. A process according to claim 4, characterised in that in step IV, the moulding substance is applied to the under side of the core.

7. A process according to claim 4, characterised in that the steps II and IV are performed simultaneously or in any order successively.

8. A process according to claim 4, characterised in that the steps III and V are performed simultaneously or in any order successively.

9. A process according to claim 4, characterised in that it further comprises a step wherein:
   (VII) the moulding substance is injected into the corner joints between the longitudinal pieces and cross pieces.

10. A process according to claim 4, characterised in that one or more steps are automated.

* * * * *